United States Patent
Emma

(10) Patent No.: US 10,902,662 B2
(45) Date of Patent: *Jan. 26, 2021

(54) STORING AND COMPARING THREE-DIMENSIONAL OBJECTS IN THREE-DIMENSIONAL STORAGE

(71) Applicant: INTERNATIONAL BUSINESS MACHINES CORPORATION, Armonk, NY (US)

(72) Inventor: Philip G. Emma, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,732

(22) Filed: Dec. 31, 2018

(65) Prior Publication Data

US 2019/0139293 A1   May 9, 2019

Related U.S. Application Data

(63) Continuation of application No. 15/901,243, filed on Feb. 21, 2018, now Pat. No. 10,217,263, which is a continuation of application No. 14/870,342, filed on Sep. 30, 2015, now Pat. No. 9,947,126.

(51) Int. Cl.
   *G06T 15/00* (2011.01)
   *G06F 3/06* (2006.01)
   *G06T 19/20* (2011.01)

(52) U.S. Cl.
   CPC .......... *G06T 15/005* (2013.01); *G06F 3/0604* (2013.01); *G06F 3/064* (2013.01); *G06F 3/0683* (2013.01); *G06T 19/20* (2013.01); *G06T 2219/2016* (2013.01)

(58) Field of Classification Search
   CPC ...................... G06T 17/00–30; G06K 9/00214
   See application file for complete search history.

(56) References Cited

U.S. PATENT DOCUMENTS

| | | | |
|---|---|---|---|
| 6,956,565 | B2 | 10/2005 | Bloomenthal |
| 9,824,483 | B2 | 11/2017 | Emma |
| 9,947,126 | B2 | 4/2018 | Emma |
| 2007/0248259 | A1 | 10/2007 | Liu |
| 2018/0182156 | A1 | 6/2018 | Emma |
| 2019/0362542 | A1 | 11/2019 | Morovic et al. |

OTHER PUBLICATIONS

List of IBM Patents or Patent Applications Treated as Related; Date Filed: Dec. 31, 2018, 2 pages.

*Primary Examiner* — Charles Tseng
(74) *Attorney, Agent, or Firm* — Cantor Colburn LLP; Vazken Alexanian

(57) ABSTRACT

A computer-implemented method includes receiving first data representing a first physical object that has three dimensions. The first data may be stored, by a computer processor, as a first digital object representing the first physical object. Storing the first data may include storing a representation of the first data in a first plurality of layers. Each layer of the first plurality of layers may include a first plurality of cells. Each cell of the first plurality of cells may have one of: a first value indicating that the first physical object exists in a physical space corresponding to a position of the cell, and a second value indicating that the first physical object does not exist in the physical space corresponding to the position of the cell.

20 Claims, 7 Drawing Sheets

STORING AND COMPARING THREE-DIMENSIONAL OBJECTS IN THREE-DIMENSIONAL STORAGE

DOMESTIC PRIORITY

This application is a continuation of and claims priority from U.S. patent application Ser. No. 15/901,243, filed on Feb. 21, 2018, entitled "STORING AND COMPARING THREE-DIMENSIONAL OBJECTS IN THREE-DIMENSIONAL STORAGE," which is a continuation of and claims priority from U.S. patent application Ser. No. 14/870,342, now U.S. Pat. No. 9,947,126, filed on Sep. 30, 2015, entitled "STORING AND COMPARING THREE-DIMENSIONAL OBJECTS IN THREE-DIMENSIONAL STORAGE." The entire contents of these prior applications are incorporated herein by reference.

BACKGROUND

Embodiments of the present invention relate to data storage and comparison and, more specifically, to storing and comparing three-dimensional objects in three-dimensional storage.

It is often useful to compare three-dimensional (3D) objects. For instance, in the case of landscapes, one might compare a known landscape to an encountered landscape to determine whether one has reached a particular location. Further, comparing faces is performed during facial recognition, for example, to identify suspects of crimes and to determine whether access should be granted to a secure resource.

Generally, comparing 3D objects requires massive computations, which can be costly in terms of both time and computing power.

SUMMARY

According to an embodiment of this disclosure, a computer-implemented method includes receiving first data representing a first physical object that has three dimensions. The first data may be stored, by a computer processor, as a first digital object representing the first physical object. Storing the first data may include storing a representation of the first data in a first plurality of layers. Each layer of the first plurality of layers may include a first plurality of cells. Each cell of the first plurality of cells may have one of: a first value indicating that the first physical object exists in a physical space corresponding to a position of the cell, and a second value indicating that the first physical object does not exist in the physical space corresponding to the position of the cell.

In another embodiment, a system includes a memory having computer readable instructions and one or more processors for executing the computer readable instructions. The computer readable instructions include receiving first data representing a first physical object that has three dimensions. Further according to the computer readable instructions, the first data may be stored as a first digital object representing the first physical object. Storing the first data may include storing a representation of the first data in a first plurality of layers. Each layer of the first plurality of layers may include a first plurality of cells. Each cell of the first plurality of cells may have one of: a first value indicating that the first physical object exists in a physical space corresponding to a position of the cell, and a second value indicating that the first physical object does not exist in the physical space corresponding to the position of the cell.

In yet another embodiment, a computer program product for storing digital objects representing physical objects includes a computer readable storage medium having program instructions embodied therewith. The program instructions are executable by a processor to cause the processor to perform a method. The method includes receiving first data representing a first physical object that has three dimensions. Further according to the method, the first data may be stored as a first digital object representing the first physical object. Storing the first data may include storing a representation of the first data in a first plurality of layers. Each layer of the first plurality of layers may include a first plurality of cells. Each cell of the first plurality of cells may have one of: a first value indicating that the first physical object exists in a physical space corresponding to a position of the cell, and a second value indicating that the first physical object does not exist in the physical space corresponding to the position of the cell.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In conventional systems, data representing three-dimensional (3D) topologies of 3D physical objects is stored in two-dimensional (2D) memory. This makes computations associated with those physical objects unwieldy and time-consuming. In contrast, various embodiments of this disclosure represent 3D physical objects in 3D storage, and may efficiently compare such 3D physical objects to one another using the 3D storage.

Figure 1A:
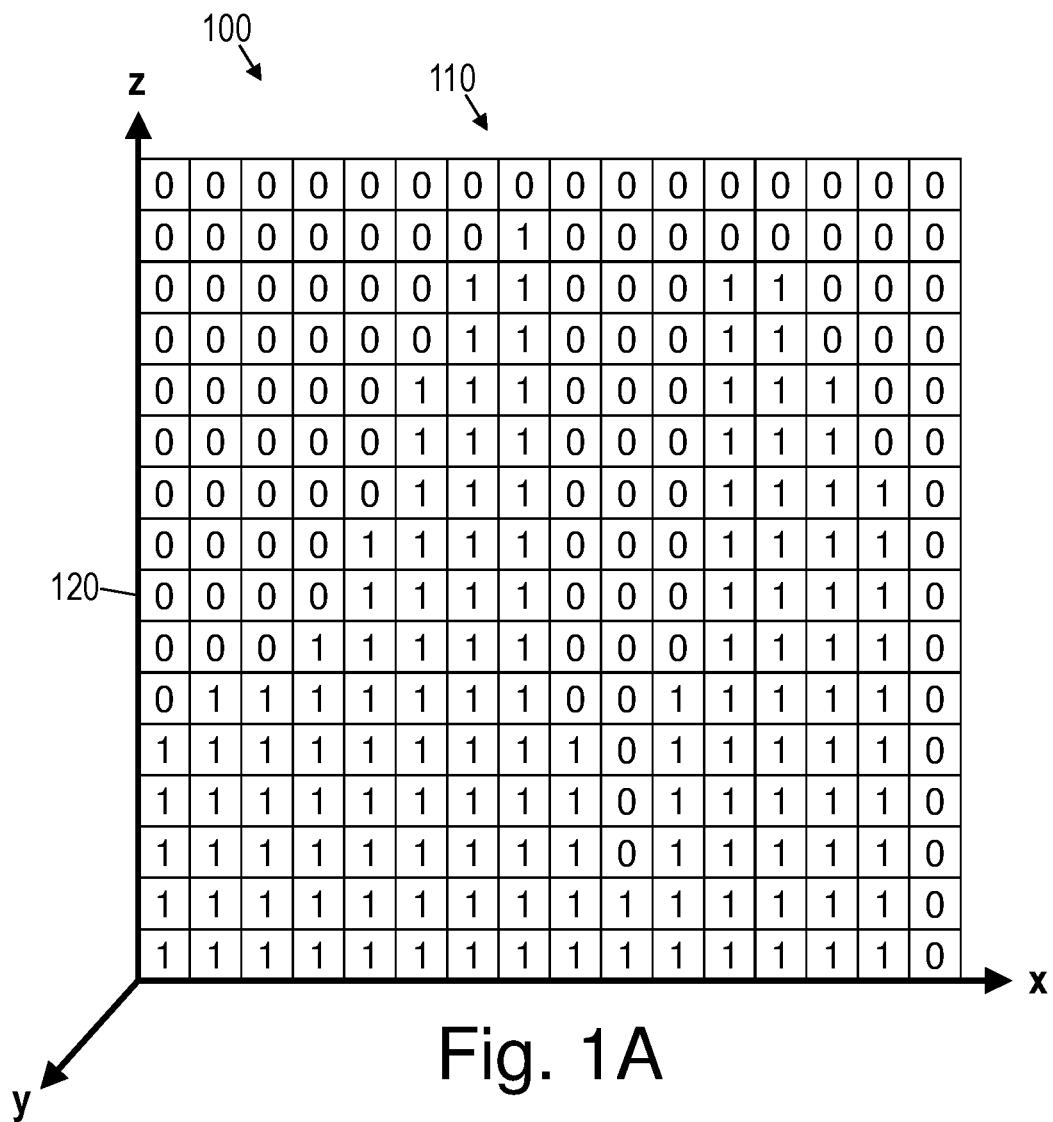
FIGS. 1A-1B illustrate a storage system for three-dimensional (3D) storage, according to some embodiments of this disclosure.
Figure 1B:
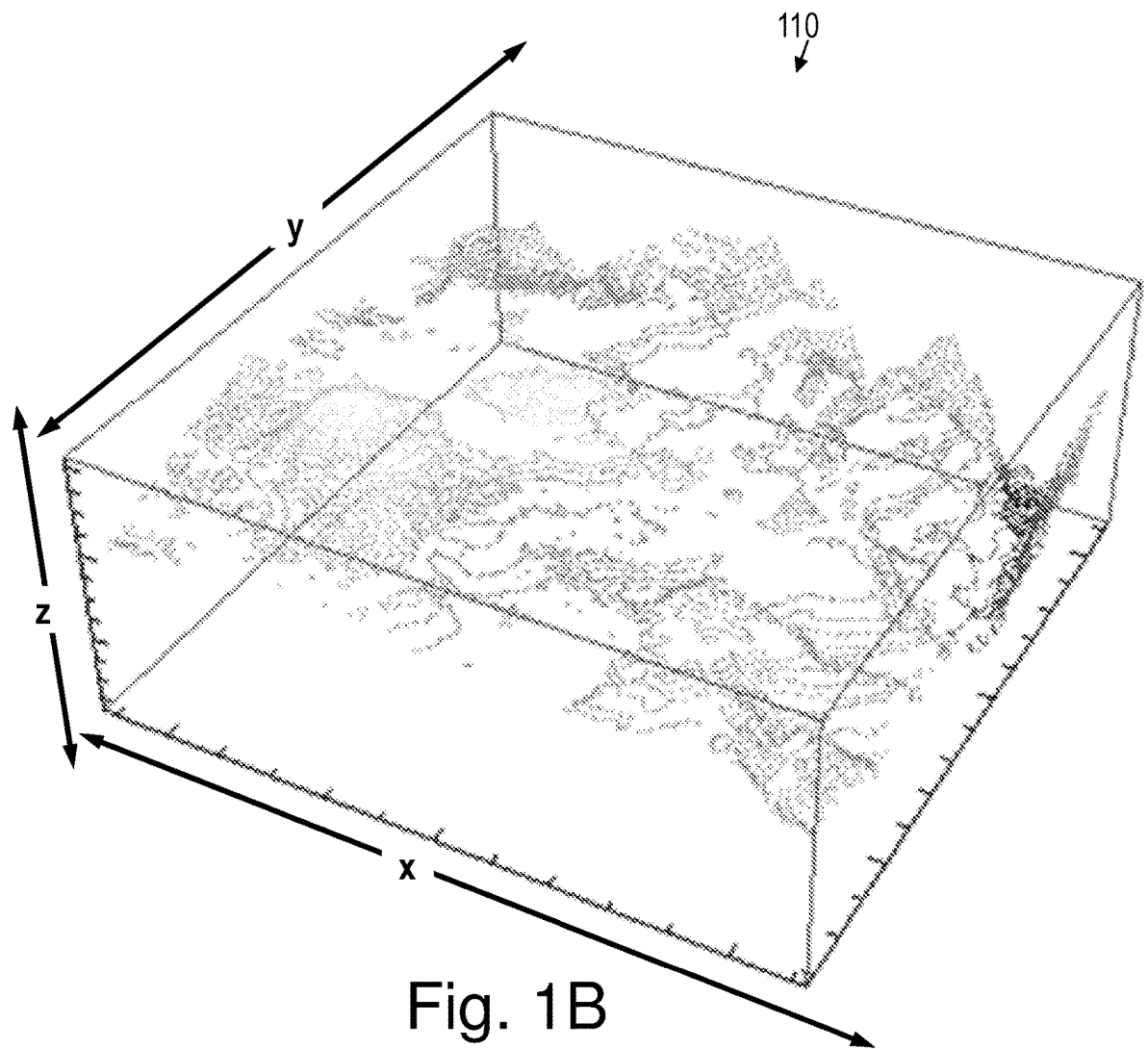

FIGS. 1A-1B illustrates a storage system 100 for 3D storage 110, according to some embodiments of this disclosure. Specifically, FIG. 1A shows a portion of a 2D vertical slice of data stored in the 3D storage 110, while FIG. 1B illustrates a 3D view of the 3D storage 110. With 3D storage 110, a 3D physical object, also referred to herein as simply a physical object, may be represented in a manner that reflects its 3D nature.

The 3D storage 110 may include two or more 2D planes, or layers, of cells 120. As shown in FIG. 1A, each cell 120 may be memory that can be set to either a value of 0 or a value of 1. In some embodiments, bit cells may be used, and in that case, each cell 120 may be capable of holding only values of 0 and 1. It will be understood, however, that cells 120 each having multiple bits may be used, although the use of bit cells may reduce the computing resources needed to store a digital object in the 3D storage 110 as compared to using larger cells.

A digital object representing a physical object, and stored in the 3D storage 110, may be a scaled representation of the physical object. Specifically, the digital object may represent the topology of the corresponding physical object. Within the 3D storage 110, a cell 120 having a value of 1 may indicate that the corresponding physical object exists in a physical space corresponding to the position of that cell 120, and a cell 120 having a value of 0 may indicate that the corresponding physical object does not exist in that corresponding physical space. It will be understood, however, that values other than 0 and 1 may be used.

In other words, at each point, or set of x-y coordinates, on a plane representing the bottom of the digital object, the digital object rises upward from that plane to a particular altitude, and then rises no further. More specifically, from that plane representing the bottom, cells 120 with the x-y coordinates in question may each have a value of 1 up to the cell 120 corresponding to the altitude of the digital object, which may represent the altitude of the physical object. Cells 120 above the cell 120 corresponding to the altitude may have a value of 0, indicating that the digital object does not exist in that space. It will be understood that the altitudes across the various x-y coordinates may vary based on the topology of the digital object. Thus, the topology of the physical object may be represented by the digital object in the 3D storage 110.

Figure 2:
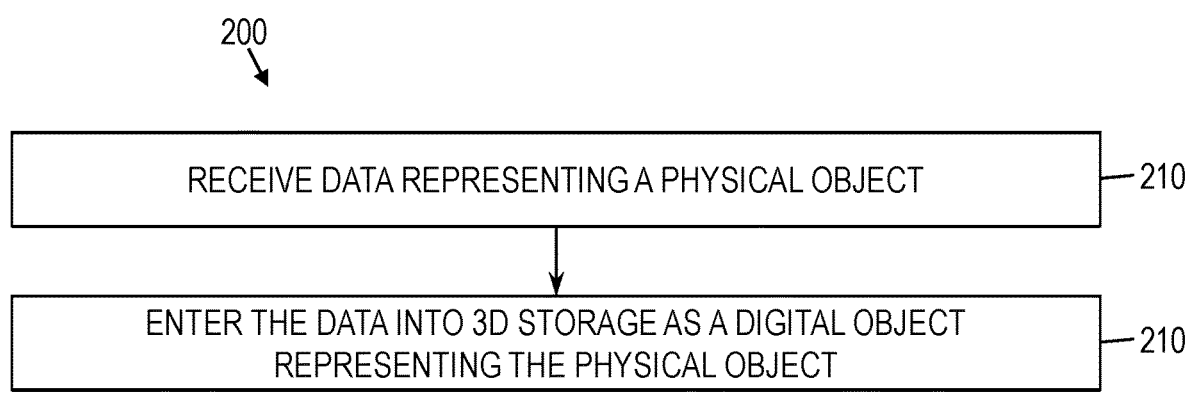
FIG. 2 is a flow diagram of a method for entering a digital object into the 3D storage to represent a physical object, according to some embodiments of this disclosure.

FIG. 2 is a flow diagram of a method 200 for entering a digital object into the 3D storage 110 to represent a physical object, according to some embodiments of this disclosure. For instance, the physical object may be a landscape or a face. As shown, at block 210, data representing the physical object may be received. For example, and not by way of limitation, cameras exist to determine the distance between the camera and the object being captured. Such a camera may be used to record a physical object's topology as digital data, and such digital data may be received at block 210. At block 220, a representation of the received data may be entered into the 3D storage 110 as a digital object representing the physical object. Specifically, the data may be entered into the cells 120 as 1s and 0s representing the topology of the physical object.

Figure 3:
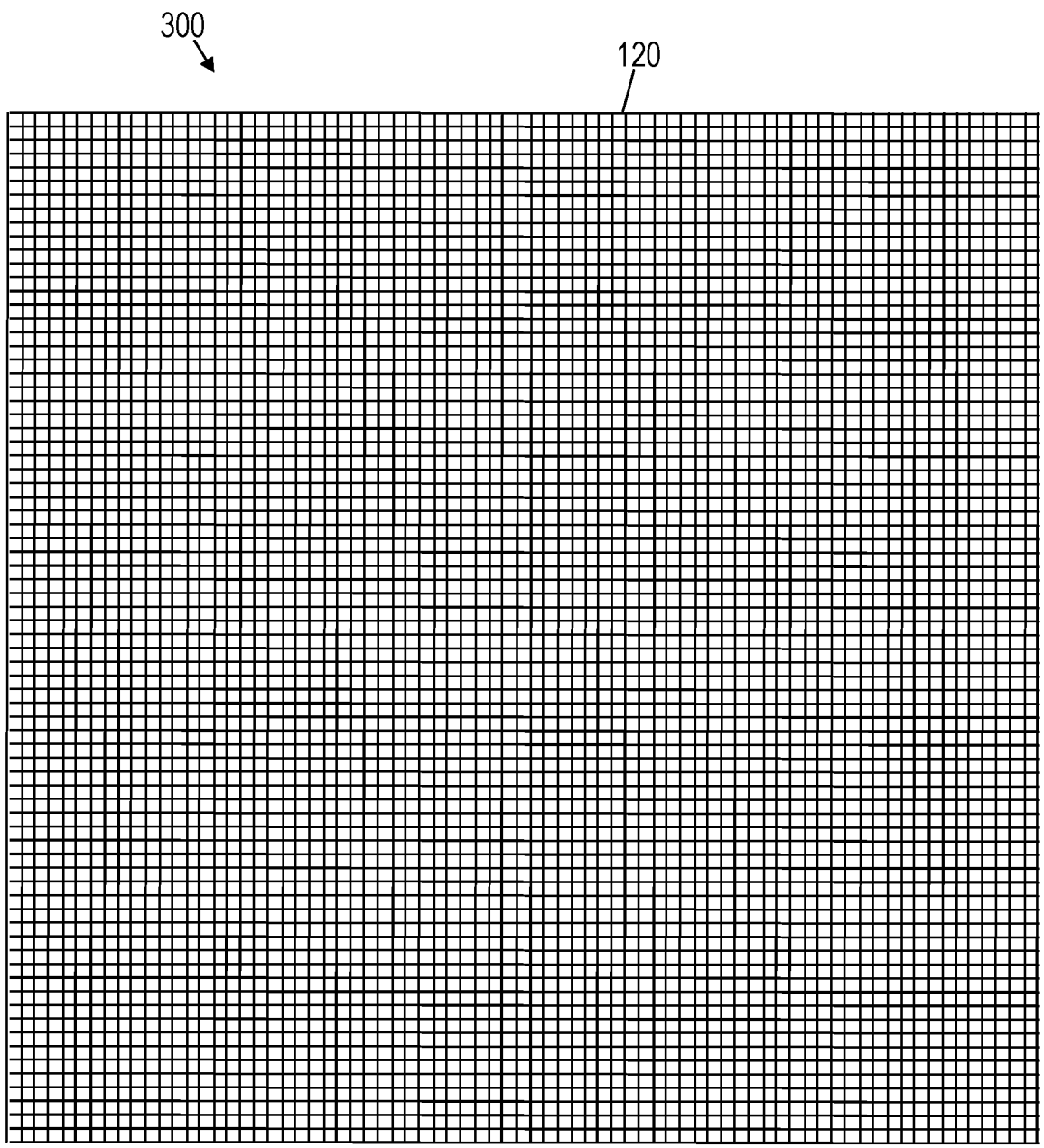
FIG. 3 illustrates example wiring of a memory surface of the 3D storage, according to some embodiments of this disclosure.

FIG. 3 illustrates example wiring of the 3D storage 110, according to some embodiments of this disclosure. From a hardware perspective, the 3D storage 110 may include two or more memory surfaces 300, which may be physical devices such as memory chips, stacked atop one another. Each memory surface 300 in the stack may act as a plane, or layer, of the 3D storage 110. Each memory surface 300 may include two dimensions of cells 120, such as bit cells. FIG. 3 specifically illustrates one memory surface 300 of the cells 120. As shown, the cells 120 may be arranged in a grid of rows and columns. Each cell 120 may be connected by wiring to the adjacent cells 120 within its row and within its column. Each cell 120 may further be connected by wires to the cell 120 above and the cell 120 below it in the stack of memory surfaces 300.

This wiring may enable efficient manipulation of the data. For instance, to shift a digital object stored in the 3D storage 110, the wiring may facilitate efficiently copying values from cell 120 to cell 120 across columns, rows, and vertically, so as to avoid having to perform calculations to determine specific coordinates of each value being moved.

Figure 4:
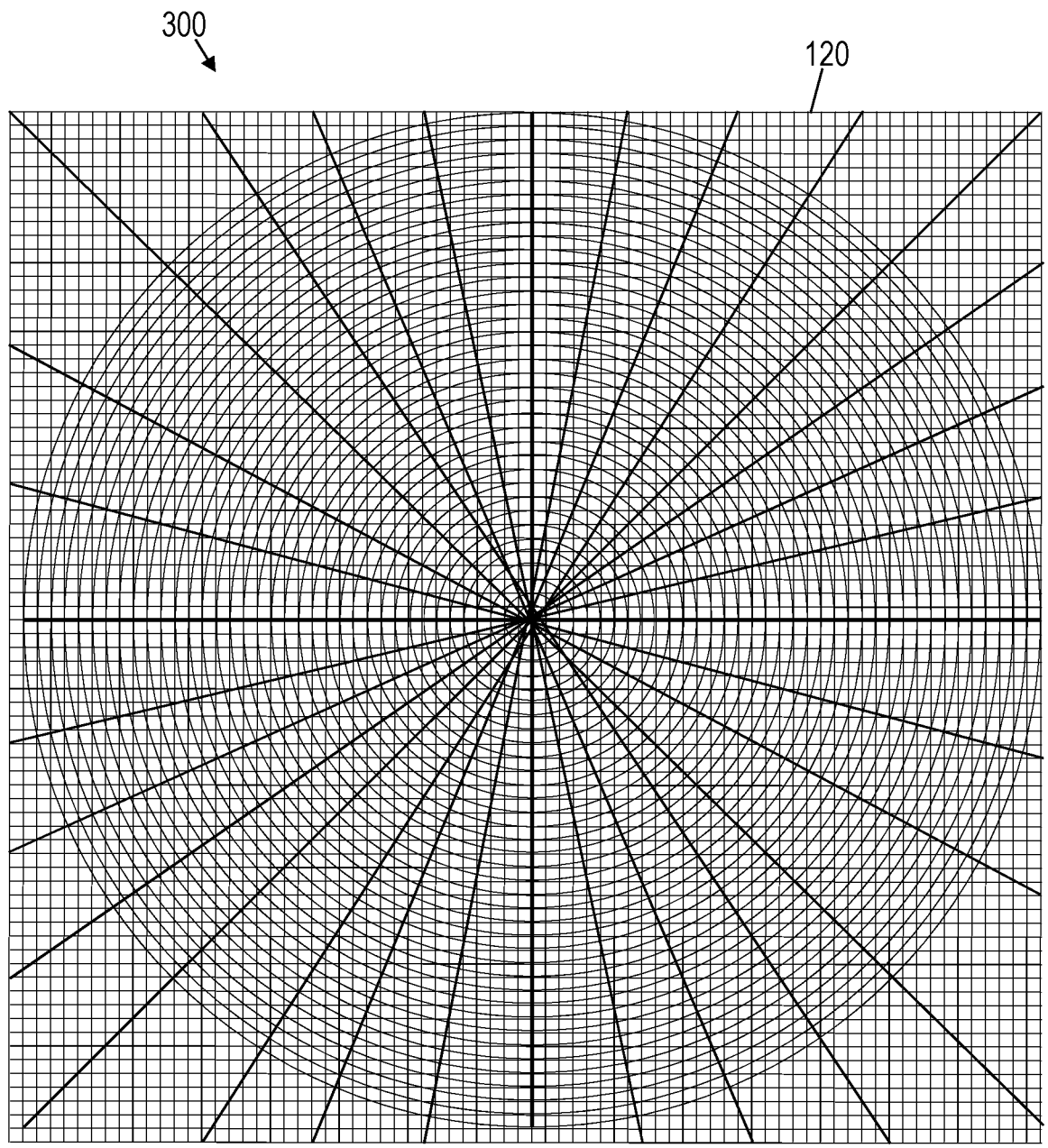
FIG. 4 illustrates another example wiring of a memory surface of the 3D storage, according to some embodiments of this disclosure.

FIG. 4 illustrates another example wiring of a memory surface 300 of the 3D storage 110, according to some embodiments of this disclosure. As shown, in some embodiments, the cells 120 may be further connected by wiring arranged in concentric circles, and the wires may be further arranged in spokes extending from a central cell 120. Although the concentric circles and spokes shown center on a single cell 120 in FIG. 4, in some embodiments, each cell 120 in the memory surface 300 may act as a center for a set of concentric circles, spokes, or both. Further, although only a single plane within a single memory surface 300 is shown, some embodiments may have additional concentric circles and spokes extending vertically and through diagonal planes of the 3D storage 110. For example, the concentric circles may be three-dimensional, resulting in concentric spheres, which may center on each cell 120 in the 3D storage 110.

In some other embodiments, however, only one set of concentric circles, or spheres, and spokes is used, centered on a central cell 120 of the memory surface 300. In such embodiments, when a topology of a physical object is entered into the 3D storage 110 as a digital object, the is representing the topology may be entered so that the digital object is centered on this center of the memory surface 300. Further, the centers of the stacked memory surfaces 300 may be aligned, such that the concentric circles on each memory surface 300 are also aligned.

The wiring described above may enable additional efficient manipulations of the data. For instance, to scale a digital object downward (i.e., to shrink it), values of the cells 120 may be copied inward along the spokes. Analogously, to scale a digital object upward (i.e., to enlarge it), values of the cells 120 may be copied outward along the spokes. To rotate a digital object, values may be rotated along the concentric circles or spheres.

In some embodiments, it is assumed that digital objects are aligned in one axis, such as the z-axis. In the case of landscapes, herein, the z-axis may be an axis pointing straight up, opposite the direction of gravity. In the case of faces, for example, the z-axis may point out through the nose, perpendicular to the direction of gravity. This assumption can be made because, in some embodiments, the digital objects may be entered into the 3D storage 110 with this assumption used as a standard. In other words, for example, landscapes may be entered with the z-axis pointing opposite gravity.

Figure 5:
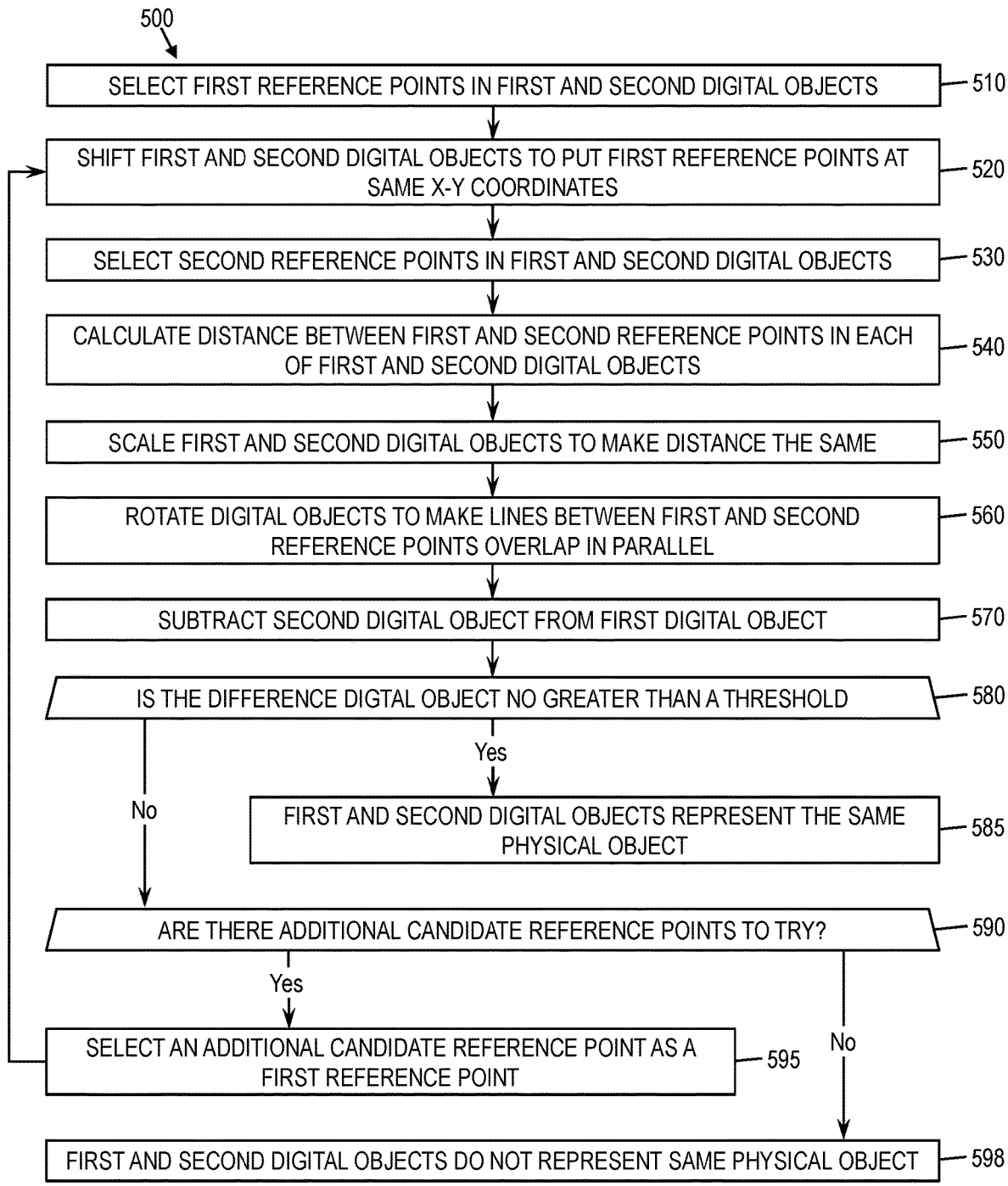
FIG. 5 is a flow diagram of a method for comparing 3D objects stored in the 3D storage, according to some embodiments of this disclosure.

FIG. 5 is a flow diagram of a method 500 for comparing digital objects stored in the 3D storage 110, and thus for comparing the corresponding physical objects, according to some embodiments of this disclosure. Specifically, a first digital object may be compared with a second digital object, both stored in 3D storage 110, to determine whether the first digital object and the second digital object have the same topology and thus represent the same physical object. For example, and not by way of limitation, this method 500 may be used for facial recognition or to match a current location to a known landscape. In some embodiments, the first digital object and the second digital object may be stored in separate 3D storages 110, which may mean being stored on distinct memory surfaces 300, or being stored on the same memory surface 300 but in a distinct coordinate space.

As shown, at block 510, a first reference point may be selected within each of the first and second digital objects. For each digital object, the first reference point may be chosen in the same manner, so as to ensure that if the first and second objects represent the same physical object, then the reference points chosen are also the same. In some embodiments, for each digital object, the first reference point is a highest point in the digital object. If the first digital object and the second digital object are the same physical object, then in some embodiments, the highest point of these two digital objects will be the same point.

The find the highest point, to be used as the first reference point, the highest layer of each digital object may be selected. This may be performed be identifying the highest layer of the 3D storage 110 for the digital object that includes at least one value of 1 in its cells 120. Given the above description of the 3D storage 110, one of skill in the art will understand how to identify the highest layer with at least one value of 1. For example, and not by way of limitation, a binary search may be performed on the layers to identify the highest layer with at least one value of 1.

For each of the first and second digital object, each cell 120 with a value of 1 within the highest layer of that digital object may be deemed a candidate reference point. One of the candidate reference points of the first digital object may be selected as the reference point of the first digital object, and one of the candidate reference points of the second digital object may be selected as the reference point of the second digital object.

At block 520, one or both of the first and second digital objects may be shifted such that their first reference points reside at the same x-y coordinates within their respective 3D storages 110. In other words, the digital objects may be shifted, with the value of each cell 120 remaining in its original layer, or plane. After the first reference points are positioned at the same x-y coordinates within their respective spaces, the first and second digital objects may be rotated and scaled, as described below, in an attempt to fully align them with each other.

At block 530, a second reference point may be selected within each of the first and second digital objects. In some embodiments, for each digital object, the second reference point is a peak or a valley of the digital object's topology. For example, in some embodiments, a second highest peak may selected within each digital object as the second reference point for that digital object, where the first reference point was the highest point, or highest peak.

In some embodiments, a second highest peak is represented by a cell 120 residing in a layer that is below the highest layer of the digital object, but that is the highest layer that has at least one value of 1 that is not adjacent to the highest point by a sequence of adjacent values of 1. In other words, the second highest point may represent a distinct peak, such that the topology of the digital object moving outward from that peak also moves downward before climbing upward to the highest point. Regardless of how the second reference point is chosen, the same manner for selecting the reference point may be used on both the first and second digital objects. As a result, in some embodiments, if the first and second digital objects are the same, the second reference points of the first and second digital objects are also the same.

If the first and second digital objects represent the same physical object, then rotating and scaling one or both of the first second digital objects so as to position the second reference points of the two digital objects at the same second x-y coordinates within their respective coordinate space, while maintaining the first reference points at their same first x-y coordinates may thus result in the first and second digital objects having the same scaling and orientation as each other. This rotating and scaling may be performed at blocks 540 through 560.

To this end, at block 540, for each digital object, a distance between the first reference point and the second reference point of that digital object may be determined. One of skill in the art will understand how to calculate this distance. In some embodiments, for example, this distance may be calculated based on the assumption that each cell 120 is a cube with an established width, height, and depth. For instance, this width, height, and depth may each be given a value of 1. Given this, the distance calculation may be performed by imagining the 3D storage 110 as an arrangement of these cubes, with each reference point existing at the center of the cube corresponding to the cell 120 of that reference point. After the distance calculations are performed, the first digital object may have a calculated distance between its first reference point and its second reference point, and the second digital object may have a calculated distance between its first reference point and its second reference point.

At block 550, one or both of the first and second digital objects may be scaled such that the distance between the first and second reference points in the first digital object matches the distance between the first and second reference points in the second digital object. For example, the second digital object may be scaled to increase or decrease the distance between its first and second reference points, as needed, to match the distance between the first and second reference points of the first digital object. After this scaling, in some embodiments, if the first and second digital objects represent the same physical object, their scaling is now also the same. However, the first and second digital objects may not yet have the same orientation.

At block 560, one or both of the first and second digital objects may be rotated, leaving the first reference points at their matching first x-y coordinates, so as to put the second reference point at second x-y coordinates that are the same for both digital objects. For example, the second digital object may be rotated around the vertical axis going through the first reference point, so as to place its second reference point at the same x-y coordinates of the first digital object's second reference point.

It will be understood that blocks 540 and 550 may be swapped with block 560, such that the rotating occurs before the scaling. For example, one or both digital objects may be rotated so as to make parallel and overlapping the lines connecting their respective first and second reference points. The scaling may then be used to put the second reference points at the same x-y coordinates as each other.

At block 570, one of the first and second digital objects may be subtracted from the other. For example, the second digital object may be subtracted from the first digital object. To subtract the second digital object from the first digital object in 3D storage 110, each column of cells 120 at an x-y position in the second digital object may be subtracted from the corresponding column of cells 120 at the same x-y coordinates in the first digital object. Generally, from the bottom upward, each column may have zero or more cells 120 having values of 1, followed by zero or more cells 120 with values of 0. The subtraction may be performed by reducing the height (i.e., the number of cells 120 having a value of 1) of the column in the first digital object by the height of the column in the second digital object. Further, in some embodiments, the subtraction further includes taking an absolute value, such that the height of each resulting column is the absolute value of the difference between the corresponding columns of the first and second digital objects. The result of subtracting one digital object from the other may be a digital object representing the difference between the first digital object and the second digital object.

At decision block 580, it may be determined whether the difference between the first and second digital objects is no greater than a threshold. If this difference is relatively flat, then the first digital object and the second digital object may be deemed to match and, thus, to represent the same physical object. For example, and not by way of limitation, a threshold difference may be established, where that threshold difference may itself be a digital object stored in 3D storage 110. If the difference between the first and second digital objects is no greater than the threshold difference, then the first and second digital objects may be deemed to match. Further, in some embodiments, one digital object may be considered no greater than another digital object if each column at each set of x-y coordinates of the one digital object is no higher than the corresponding column at the same x-y coordinates of the other digital object.

If the difference is no greater than the threshold difference, then at block 585, the first and second digital objects may be deemed to match and to represent the same physical object. If the difference is greater than the threshold difference, then at decision block 590, it may be determined whether additional candidate reference points exist for one of the two digital objects, for example, the first digital object.

In some embodiments, the method 500 may try all combinations of candidate reference points of the first and second digital objects, but in some other embodiments, only the candidate reference points of one digital object are considered for additional attempts at matching. Generally, it may be expected that if the two digital objects match, at least one of the candidate reference points of the first digital object will lead to match based on one selected candidate reference point of the second digital object. If an additional candidate reference point remains and has not yet been selected as the first reference point for determining whether the first and second digital objects match, then at block 595, that additional candidate reference point may be selected as the first reference point. Additionally, in that case, the method 500 may return to block 520 after the additional candidate reference point is chosen as the first reference point. On the other hand, if all candidate reference points have been tried and no match has been found between the first and second digital objects, then at block 598, the first and second digital objects may be deemed not to represent the same physical object.

One of skill in the art will understand that, analogously, multiple candidate second reference points may be used for the second reference point when determining whether the first and second digital objects match. In that case, after selecting a new second reference point to use, the method 500 may return to block 540 to test the first and second digital objects for matching.

Figure 6:
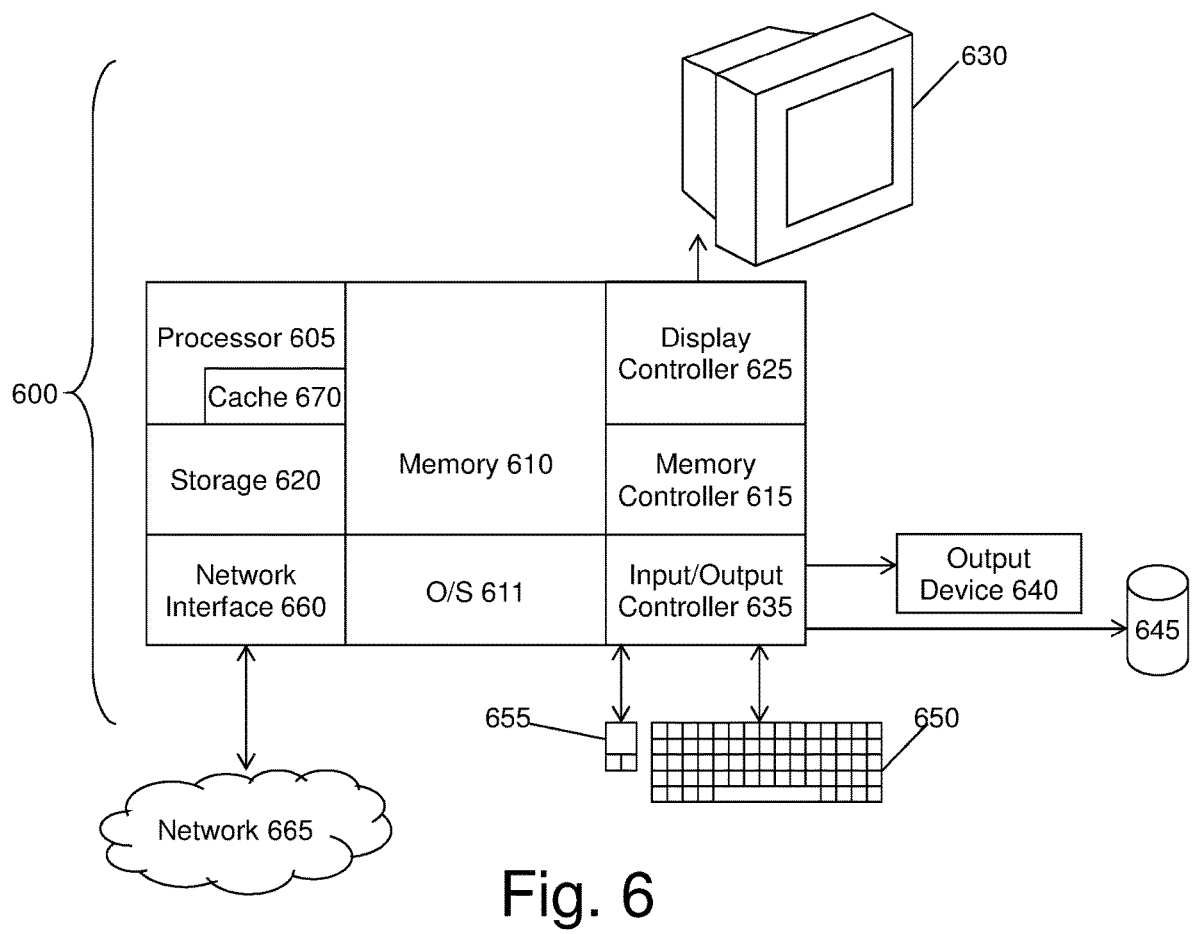
FIG. 6 is a block diagram of a computer system for implementing some or all aspects of the storage system, according to some embodiments of this disclosure.

FIG. 6 illustrates a block diagram of a computer system 600 for use in implementing a storage system or method according to some embodiments. The storage systems and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. In some embodiments, the storage 620 includes 3D storage 110, such as that described above. The stored instructions in memory 610 or in storage 620 may include those enabling the processor to execute one or more aspects of the storage systems and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Storage systems and methods according to this disclosure may be embodied, in whole or in part, in computer program products or in computer systems 600, such as that illustrated in FIG. 6.

Technical effects and benefits of some embodiments include the ability to store digital objects in 3D storage 110 that mirrors the actual topologies of corresponding physical objects. Further, because of the structure of the 3D storage 110, manipulations of the digital objects may be performed without at least some of the complex mathematical calculations conventionally performed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving first data representing a first physical object that has three dimensions; and
   storing, in a three-dimensional storage, the first data as a first digital object representing the first physical object;
   wherein the three-dimensional storage comprises a total plurality of cells in a plurality of two-dimensional storage layers stacked atop one another, wherein each two-dimensional storage layer comprises a corresponding plurality of cells arranged in a respective layer;
   wherein, within each two-dimensional storage layer of the total plurality of cells, the corresponding plurality of cells are wired together in a plurality of concentric circles; and
   wherein the storing comprises:
   storing, in the corresponding plurality of cells of each two-dimensional storage layer, a plurality of values representing a topology of a respective layer of the first physical object;
   wherein, as a result of the storing, each cell of the plurality of two-dimensional storage layers has one of: a first value indicating that the first physical object exists in a physical space corresponding to a position of the cell of the plurality of two-dimensional storage layers, and a second value indicating that the first physical object does not exist in the physical space corresponding to the position of the cell of the plurality of two-dimensional storage layers.

2. The computer-implemented method of claim 1, wherein each cell in the total plurality of cells of the three-dimensional storage is wired to each other adjacent cell in horizontal and vertical directions.

3. The computer-implemented method of claim 1, wherein the total plurality of cells are wired together in a plurality of concentric spheres across the plurality of two-dimensional storage layers.

4. The computer-implemented method of claim 1, further comprising:
   storing a second digital object representing a second physical object, wherein the second digital object comprises a second plurality of storage layers, each storage layer of the second plurality of storage layers comprising a second plurality of cells; and
   comparing the first digital object to the second digital object to determine whether the first physical object is the same as the second physical object, wherein the comparing comprises:
   modifying the second digital object to match a scaling and orientation of the first digital object;
   generating a difference digital object by subtracting the second digital object from the first digital object; and
   determining that the first physical object and the second physical object are the same, responsive to the difference digital object being no greater than a threshold digital object.

5. The computer-implemented method of claim 4, wherein the modifying the second digital object to match the scaling and orientation of the first digital object further comprises:
   selecting a first reference point in the first digital object;
   selecting a second reference point in the first digital object;

selecting a third reference point in the second digital object, wherein a mechanism used to select the third reference point is the same as the mechanism used to select the first reference point;

selecting a fourth reference point in the second digital object, wherein a mechanism used to select the fourth reference point is the same as the mechanism used to select the second reference point; and scaling the second digital object to make a distance between the first reference point and the second reference point in the first digital object match a distance between the third reference point and the fourth reference point in the second digital object.

6. The computer-implemented method of claim 4, wherein the modifying the second digital object to match the scaling and orientation of the first digital object further comprises:

selecting a first reference point in the first digital object;

selecting a second reference point in the first digital object;

selecting a third reference point in the second digital object, wherein a mechanism used to select the third reference point is the same as the mechanism used to select the first reference point;

selecting a fourth reference point in the second digital object, wherein a mechanism used to select the fourth reference point is the same as the mechanism used to select the second reference point; and rotating the second digital object to make a first line between the first reference point and the second reference point in the first digital object parallel to a second line between the third reference point and the fourth reference point in the second digital object.

7. The computer-implemented method of claim 4, wherein the generating the difference digital object by subtracting the second digital object from the first digital object further comprises:

reducing a height of a first column at first x-y coordinates in the first digital object by a height of a second column at the first x-y coordinates in the second digital object.

8. A system comprising:

a memory having computer readable instructions; and one or more processors for executing the computer readable instructions, the computer readable instructions comprising:

receiving first data representing a first physical object that has three dimensions; and storing, in a three-dimensional storage, the first data as a first digital object representing the first physical object;

wherein the three-dimensional storage comprises a total plurality of cells in a plurality of two-dimensional storage layers stacked atop one another, wherein each two-dimensional storage layer comprises a corresponding plurality of cells arranged in a respective layer;

wherein, within each two-dimensional storage layer of the total plurality of cells, the corresponding plurality of cells are wired together in a plurality of concentric circles; and wherein the storing comprises:

storing, in the corresponding plurality of cells of each two-dimensional storage layer, a plurality of values representing a topology of a respective layer of the first physical object;

wherein, as a result of the storing, each cell of the plurality of two-dimensional storage layers has one of: a first value indicating that the first physical object exists in a physical space corresponding to a position of the cell of the plurality of two-dimensional storage layers, and a second value indicating that the first physical object does not exist in the physical space corresponding to the position of the cell of the plurality of two-dimensional storage layers.

9. The system of claim 8, wherein each cell in the total plurality of cells of the three-dimensional storage is wired to each other adjacent cell in horizontal and vertical directions.

10. The system of claim 8, wherein the total plurality of cells are wired together in a plurality of concentric spheres across the plurality of two-dimensional storage layers.

11. The system of claim 8, the computer readable instructions further comprising:

storing a second digital object representing a second physical object, wherein the second digital object comprises a second plurality of storage layers, each storage layer of the second plurality of storage layers comprising a second plurality of cells; and comparing the first digital object to the second digital object to determine whether the first physical object is the same as the second physical object, wherein the comparing comprises:

modifying the second digital object to match a scaling and orientation of the first digital object;

generating a difference digital object by subtracting the second digital object from the first digital object; and determining that the first physical object and the second physical object are the same, responsive to the difference digital object being no greater than a threshold digital object.

12. The system of claim 11, wherein the modifying the second digital object to match the scaling and orientation of the first digital object further comprises:

selecting a first reference point in the first digital object;

selecting a second reference point in the first digital object;

selecting a third reference point in the second digital object, wherein a mechanism used to select the third reference point is the same as the mechanism used to select the first reference point;

selecting a fourth reference point in the second digital object, wherein a mechanism used to select the fourth reference point is the same as the mechanism used to select the second reference point; and scaling the second digital object to make a distance between the first reference point and the second reference point in the first digital object match a distance between the third reference point and the fourth reference point in the second digital object.

13. The system of claim 11, wherein the modifying the second digital object to match the scaling and orientation of the first digital object further comprises:

selecting a first reference point in the first digital object;

selecting a second reference point in the first digital object;

selecting a third reference point in the second digital object, wherein a mechanism used to select the third reference point is the same as the mechanism used to select the first reference point;

selecting a fourth reference point in the second digital object, wherein a mechanism used to select the fourth reference point is the same as the mechanism used to select the second reference point; and rotating the second digital object to make a first line between the first reference point and the second reference point in the first digital object parallel to a second line between the third reference point and the fourth reference point in the second digital object.

14. The system of claim 11, wherein the generating the difference digital object by subtracting the second digital object from the first digital object further comprises:
  reducing a height of a first column at first x-y coordinates in the first digital object by a height of a second column at the first x-y coordinates in the second digital object.

15. A computer-program product for storing digital objects representing physical objects, the computer program product comprising a non-transitory computer readable storage medium having program instructions embodied therewith, the program instructions executable by a processor to cause the processor to perform a method comprising:
  receiving first data representing a first physical object that has three dimensions; and
  storing, in a three-dimensional storage, the first data as a first digital object representing the first physical object;
  wherein the three-dimensional storage comprises a total plurality of cells in a plurality of two-dimensional storage layers stacked atop one another, wherein each two-dimensional storage layer comprises a corresponding plurality of cells arranged in a respective layer;
  wherein, within each two-dimensional storage layer of the total plurality of cells, the corresponding plurality of cells are wired together in a plurality of concentric circles; and
  wherein the storing comprises:
  storing, in the corresponding plurality of cells of each two-dimensional storage layer, a plurality of values representing a topology of a respective layer of the first physical object;
  wherein, as a result of the storing, each cell of the plurality of two-dimensional storage layers has one of: a first value indicating that the first physical object exists in a physical space corresponding to a position of the cell of the plurality of two-dimensional storage layers, and a second value indicating that the first physical object does not exist in the physical space corresponding to the position of the cell of the plurality of two-dimensional storage layers.

16. The computer-program product of claim 15, wherein each cell in the total plurality of cells of the three-dimensional storage is wired to each other adjacent cell in horizontal and vertical directions.

17. The computer-program product of claim 15, wherein the total plurality of cells are wired together in a plurality of concentric spheres across the plurality of two-dimensional storage layers.

18. The computer-program product of claim 15, the method further comprising:
  storing a second digital object representing a second physical object, wherein the second digital object comprises a second plurality of storage layers, each storage layer of the second plurality of storage layers comprising a second plurality of cells; and
  comparing the first digital object to the second digital object to determine whether the first physical object is the same as the second physical object, wherein the comparing comprises:
  modifying the second digital object to match a scaling and orientation of the first digital object;
  generating a difference digital object by subtracting the second digital object from the first digital object; and
  determining that the first physical object and the second physical object are the same, responsive to the difference digital object being no greater than a threshold digital object.

19. The computer-program product of claim 18, wherein the modifying the second digital object to match the scaling and orientation of the first digital object further comprises:
  selecting a first reference point in the first digital object;
  selecting a second reference point in the first digital object;
  selecting a third reference point in the second digital object, wherein a mechanism used to select the third reference point is the same as the mechanism used to select the first reference point;
  selecting a fourth reference point in the second digital object, wherein a mechanism used to select the fourth reference point is the same as the mechanism used to select the second reference point; and
  performing at least one of:
  scaling the second digital object to make a distance between the first reference point and the second reference point in the first digital object match a distance between the third reference point and the fourth reference point in the second digital object, and
  rotating the second digital object to make a first line between the first reference point and the second reference point in the first digital object parallel to a second line between the third reference point and the fourth reference point in the second digital object.

20. The computer-program product of claim 18, wherein the generating the difference digital object by subtracting the second digital object from the first digital object further comprises:
  reducing a height of a first column at first x-y coordinates in the first digital object by a height of a second column at the first x-y coordinates in the second digital object.

* * * * *